INVENTOR.
FRANK W. TOPPING

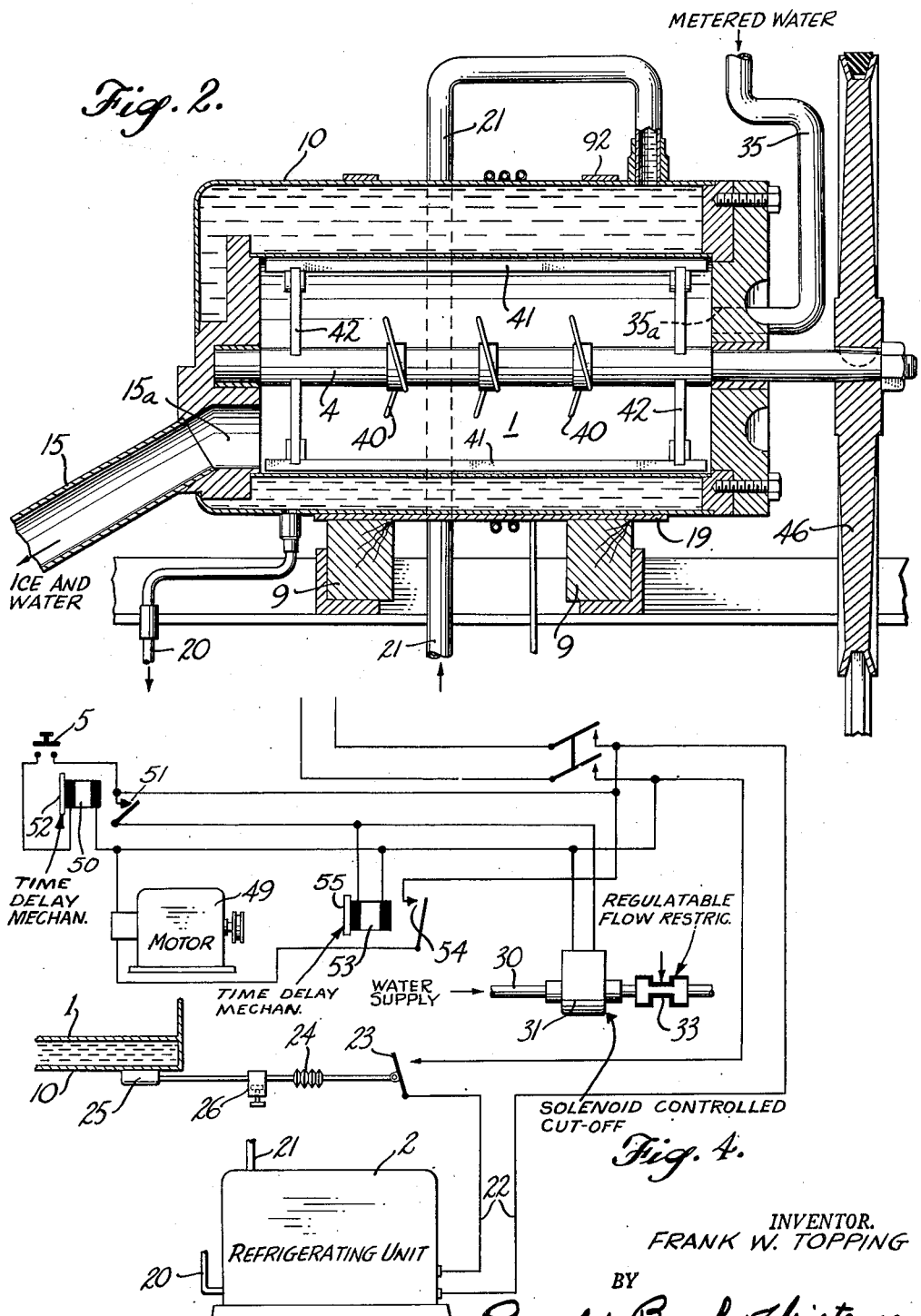

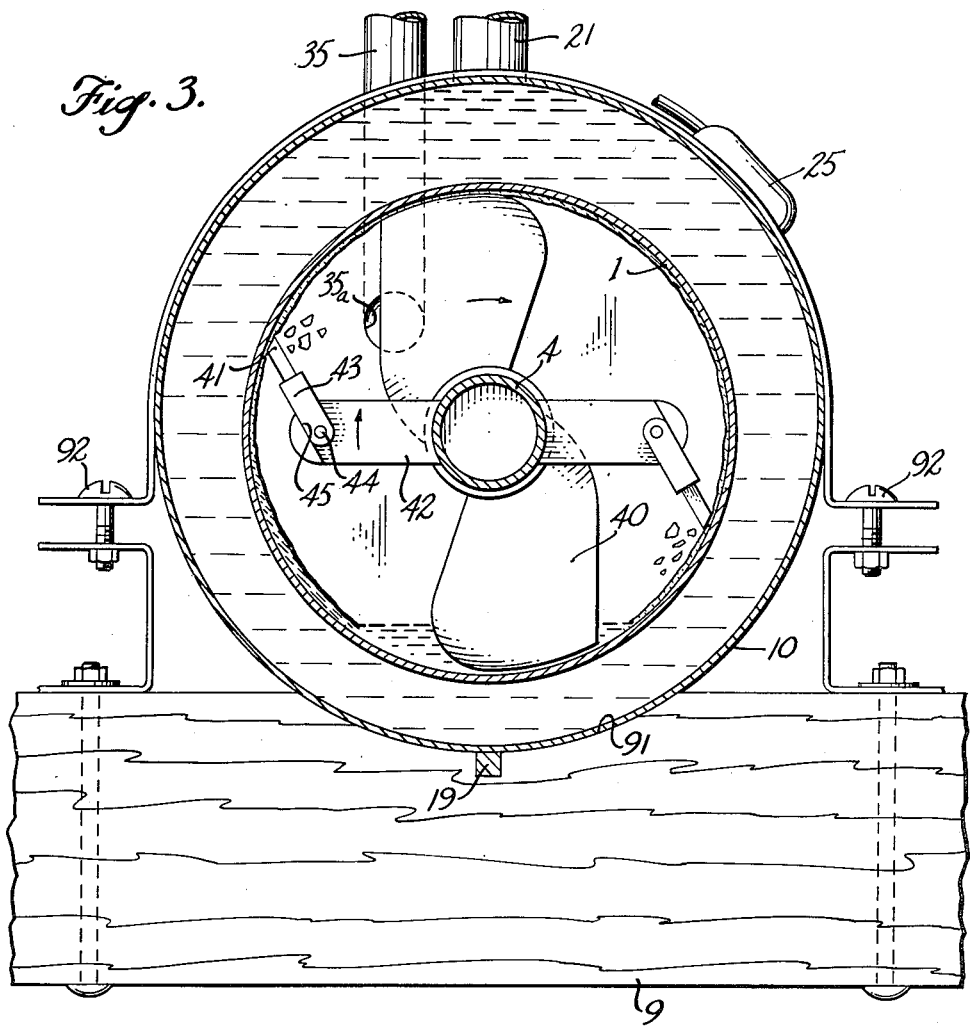

United States Patent Office 2,706,385
Patented Apr. 19, 1955

2,706,385

ICE AND WATER DISPENSERS

Frank W. Topping, Seattle, Wash.

Application November 19, 1951, Serial No. 257,063

6 Claims. (Cl. 62—4)

The present invention relates to a dispenser for crushed ice and water, in some predetermined ratio, and is an extension of the subject matter of my Patent No. 2,556,510 issued June 12, 1951, for a Crushed Ice Dispenser. Like that dispenser, the present one is particularly intended for use at bars, in clubs, in restaurants, and in other places where there is virtually constant need for ice water. The device of my patent was designed primarily for dispensing crushed ice as such, to which, if, when, and in the amounts desired, water was added later. The present device is capable of supplying all crushed ice, but would normally be so designed, adjusted, and coordinated that it would supply in the first instance a mixture of crushed ice and of water (or other aqueous liquid) chilled to 32° F., in whatever ratio is desired, and for which it is adjusted.

The present device may also be designed and arranged to dispense measured quantities of a chilled aqueous liquid conjointly with crushed ice, and in that sense may be employed in connection with coin-control mechanism to dispense soft drinks. It is, however, normally intended for operation by an attendant to supply crushed ice and water in volume controllable by the attendant, and not necessarily constant with each discharge. While the ratio of crushed ice to water is capable of variation, it is not intended to be variable from one discharge to the next, but is preferably set preliminarily, and thereafter will dispense the set ratio.

The new controls provided by this invention include a means to regulate the total volume of water admitted to the freezing chamber; a means to regulate the rate of flow of water, that is the volume per unit of time, admitted; and the latter provides primarily a means to regulate the ratio of ice formed to total water admitted. Since that ratio is a function of rate of flow as related to freezing capacity of the refrigerating unit and to the available heat transfer area of the freezing chamber, it follows that the ratio, or the upper and lower limits thereof, is subject to regulation by changes in the inherent design of the mechanism, or by adjustments in the refrigerating unit to vary its freezing capacity. Ordinarily, however, changes in the ratio will be accomplished by varying the rate of flow of water to the freezing chamber. A further control provided by this invention, not included in the patent, furnishes a means to regulate from time to time, as needed, the temperature range maintained within the freezing chamber. This, too, has its effect on the ratio of ice to water.

The present invention preferably retains the distinctive features of the patent device, in that provision is made for clearing all ice and water from the freezing chamber by continued operation of expelling means for a sufficient period of time following cessation of the admission of water to such chamber, and coordinates such clearing operation with the added controls, namely, that which regulates the ratio of water and ice discharged, or, if used, that which regulates the amount of water admitted, or that which regulates the rate of water supply to the freezing chamber, or any two or more thereof.

It is believed that sufficient has been said to indicate the general objects and nature of the present invention, and its differences over the mechanism of my prior patent, and that further objects and distinctions will appear more fully as this specification progresses.

In the accompanying drawing the invention is shown embodied in a preferred mechanical form and arrangement, but it will be understood that changes may be made therein within the intent of this specification and the claims, without departing from the spirit and scope of the invention, otherwise than as limited by the claims.

Figure 2 is an axial sectional view through the freezing chamber and associated parts, on a scale somewhat enlarged over that of Figure 1.

Figure 3 is a transverse sectional view through the freezing chamber and associated parts, on a scale still further enlarged from that of Figure 1.

Figure 4 is a general electrical and partial hydraulic diagram of the apparatus and its controls.

Figure 1:
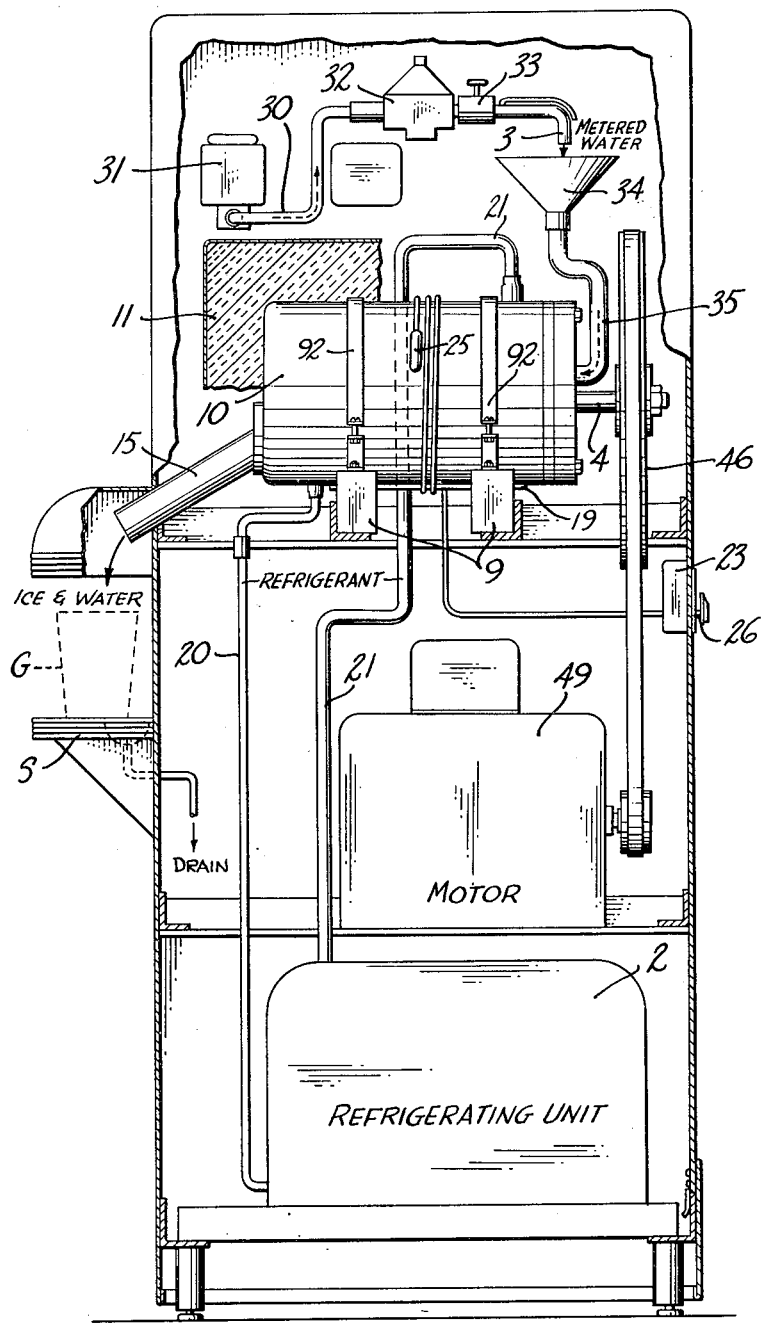
Figure 1 is a general elevational view of the device, with the housing and heat insulation shown in section to avoid obscuring the working parts.

In general this mechanism resembles that of my prior patent in that it includes a freezing chamber 1, which is preferably, but not necessarily, of generally cylindrical shape, with its axis disposed substantially horizontally. The freezing chamber 1 is surrounded with a jacket 10, to which and from which refrigerant is supplied and withdrawn by pipes 20 and 21 leading to and from any known type of refrigerating unit, generally represented at 2, the details of which are not in themselves important. The jacket 10 would ordinarily be surrounded by insulation which, however, has been omitted for greater clarity of illustration, except fragmentarily at 11 in Figure 1.

The refrigerating unit 2 is chosen of some particular rated capacity—for example, to abstract 4000 B. t. u. per hour from the contents of and by heat exchange through the walls of the chamber 1—at whatever temperature range it is designed to run the cooling unit. This must be coordinated with the time period during which the liquid supplied to the chamber 1 is intended to remain therewithin, so that with the cooling unit of the capacity chosen, and with the area of cooling surface available for the cooling or freezing of the water, a certain amount of heat will be abstracted from the water during this time and at the rate the water is flowing through the cooling unit. The first effect is to extract the sensible heat from the water to bring the water down to the 32° freezing point, and thereafter, as further heat is abstracted from the water, in the amount of 144 B. t. u. per pound of water, that amount of water will freeze and turn to ice. It follows that the amount of ice obtained is dependent upon the rating of the refrigerating unit 2, upon the available area of the surface of the freezing chamber 1, upon the volume of water in that chamber and in contact with its surface at one time, and upon the rate at which it flows through that chamber. These several factors are capable of adjustment and regulation, either from time to time or in the basic design, and by their relative adjustment and coordination it becomes possible to deliver a fairly constant ratio of water to ice for any given relationship or setting of the several factors.

One of the factors is the temperature at which the refrigerating unit commences and stops circulation of the refrigerant. The refrigerating unit being electrically driven by the leads 22, its energization is controlled by a switch 23, and closure of this switch is accomplished through a pressure-sensitive element 24, in conjunction with a liquid-filled thermostat 25, the temperature control system being adjustable by a pressure-adjusting element such as indicated at 26. By these or equivalent means, for any given rate of water flow and water volume, and with a given balance between the capacity of the refrigerating unit and of the freezing chamber, the refrigeration unit may be cut in and cut out at whatever temperatures are found best suited to the particular delivery desired.

Another factor in regulating the ratio of water to ice is the rate of supply of water to the interior of the chamber. Water is supplied to the interior of the chamber 1 through a supply line 30 and past a solenoid-controlled cutoff valve 31, and thence past a pressure-reducing valve 32, and a regulatable flow restriction 33. The latter may be separate from or included as a part of the pressure-reducing valve 32, but is shown separately for clarity of illustration. So long as the solenoid valve 31 is open, water from a normal city supply source, or the like, flows by way of the line 30 through the pressure-reducing valve 32, past which, at constant pressure, it flows through the restriction or orifice 33 to a delivery spout 3, and is received within a funnel 34 and passes by way of a lead-in pipe 35 to the interior of the freezing chamber 1. The pressure being constant ahead of the restriction at 33, it becomes evident that the rate of flow of the water is a function of the degree of restriction afforded at 33. By lessening the size of the restriction at 33, the flow rate is cut down, or vice versa. With a lower flow rate a smaller volume of water is in the freezing chamber at any one instant, and it can take up more heat (within the capacity of the heat transfer and refrigerating means), hence there will be produced a higher ratio of ice to water.

The rate of movement of water and ice through the chamber 1, and consequently the time period during which (at any flow rate) it remains within the chamber, subject to freezing therein, is ordinarily predetermined by the design of rotative impeller means within the chamber. These impeller means are so constructed and arranged as to move the water from the inlet at 35a to the outlet at 15a, whence it passes by way of a spout 15 to a receptacle, such as the glass G, supported or held beneath the exit of the spout. Ordinarily a shelf S would be provided for the support of such a receptacle. This rate of movement is ordinarily chosen sufficiently high that the water and ice is expelled a few seconds after its admission, and must be frozen almost instantaneously on contact with the chamber's walls. The rotational rate of the impeller means should be high enough—several revolutions per second—and its design should be such, that it throws the water centrifugally upon all parts of the chamber's walls, to take advantage of all available area, and also such that the ice is dislodged immediately it is formed, and the ice and water are advanced rapidly through and expelled from the chamber.

To these ends the impeller means may include axial-impelling blades 40 spaced at axial intervals, and which are pitched similarly to propeller blades, and circumferential scraper blades 41, which scrape close to and extend the full length of the walls of the freezing chamber 1. Both are supported from a shaft 4, which is rotatably mounted coaxially of the chamber 1. The impelling blades 40 are rigidly secured to this shaft, but the scraper blades 4 are preferably mounted through the medium of radial arms 42, which are rigid with the shaft, on the outer ends of which arms the scraper blades 41 are mounted through the medium of inclined links 43 pivotally mounted at 44. A stop shoulder 45, also on the outer ends of those arms 42, engages each link 43, so that the links and their scraper blades may move relatively to the arms 42, but are flung outwardly by centrifugal force, and in the direction of rotation indicated, they bring up solidly against the shoulders 45 as stops. The scraper blades 41 are thus held accurately in close spacing from the wall of the chamber 1, close enough to scrape all the ice therefrom, but just far enough to avoid actual contact with the chamber wall.

It will be evident that the rate of movement of ice and water through the freezing chamber, hence the ratio of ice to water discharged, is dependent in some measure on the pitch of the impelling blades 40, and likewise upon their rotational rate. Such factors are capable of regulation, and in particular the rate of their rotation. However, it is intended that the control of the ice-to-water ratio shall be primarily, if not wholly, regulated by regulation of the flow restriction at 33, in the manner and to the end already explained.

The shaft 4, externally of the chamber 1, mounts a drive pulley 46 or the like, by which it is belt-driven from a motor 49 which preferably is independent of any motor in the refrigeration unit 2. The speed of this motor could be regulatable, to afford a means to vary the ice-to-water ratio, as has been explained above, although this is not a presently preferred arrangement.

To complete the description of the mechanism before going to the electrical diagram and the controls, it will be noted in Figure 3 that the jacket 10 of the freezing chamber rests in arcuate recesses 91 of cross bars 9 which constitute part of the frame work of the machine, these being preferably of wood for heat insulation, and there is a key 19 which is welded or brazed, or otherwise permanently secured, exteriorly of and lengthwise of the jacket 10, and which is received in a corresponding notch in the supporting bars 9, wherefore, the chamber and its jacket being bolted down to the bars 9 by clamp means as indicated at 92, the torque of the impeller means and impeller drive mechanism cannot effect rotation of the freezing chamber and its jacket, yet the latter may be removed readily if there is need for its removal.

Coming now to Figure 4, a normally self-opening push button is illustrated at 5, closure of which energizes the relay 50, which closes the switch at 51. The relay at 50 and the switch at 51 have associated with them a time-delay mechanism diagrammatically indicated at 52, whereby the switch 51 will be self-opening a predetermined period of time following release of the push button 5 and opening of the circuit at that point. Such time-delay mechanism will not be needed nor desired, however, when the attendant is to obtain quantities of ice water which vary from time to time, and in such cases it may be omitted and the closure of the switch 51 may be accomplished directly by closure of the push button at 5, the switch at 51 to be omitted also or to remain closed only so long as the push button at 5 is held closed, and then the circuit opens immediately. Furthermore, the push button at 5 might be replaced by or constitute a part of coin control mechanism whereby, through such time-delay means at 52, the switch 51 would remain closed for a given period of time to deliver a given quantity of water or other aqueous liquid, with ice.

So long as the circuit is closed through the switch 51, or if that is omitted, through the push-button 5, the solenoid valve 31 is energized and held open, and water flows through the supply line 30 and through the hydraulic devices already described, for delivery to the interior of the freezing chamber 1.

Closure of the switch at 51 has a further effect. It energizes the relay 53 and thereby closes the switch at 54. This relay also is provided with time-delay mechanism indicated at 55, whereby the switch 54 will be held closed for a given period of time and then will be permitted to open, as it does automatically. So long as the switch 54 is closed, the motor 49 remains energized. By proper design or adjustment or regulation of the time-delay devices at 52 and at 55, respectively, the switch 54 may be caused to remain closed a given period of time after the opening of switch 51. Therefore, so long as the switch 51 is closed, the switch 54 is closed, and while the switch 51 (if the time delay mechanism at 52 is employed) remains closed for a given period of time after opening of the push button switch at 5, the switch at 54 remains closed for a further period of time, and opens a given period of time after the opening of the switch at 51.

The opening of the switch at 51 deenergizes the solenoid valve 31 and effects cessation of water supply to the freezing chamber at 1. However, since the switch at 54 continues closed for a time, the motor 49 continues to be energized, and therefore continues to operate the impelling devices 40 and 41 to impel the water and ice within the chamber 1 to the discharge opening 15a and into the spout 15 for delivery to the receptacle G. The result of all this is to supply a quantity of water which is governed in part by the length of time the switch 51 is closed, and to impel that water, and all of it, either in the form of liquid water or of ice, out of the chamber 1 so that it will not congeal there after cessation of operation of the impelling means, and block future operation thereof.

On the other hand, the length of time that the water remains within the freezing chamber, and the volume which is therein during any particular instant, is controlled in part by the size of the variable restriction at 33. If the flow rate is cut down, there will be less water at any one time within the freezing chamber, and a larger percentage thereof will congeal into ice—that is, the less volume within the freezing chamber at any one time the less is the freezing capacity thereof overloaded, and the more nearly complete is the congelation into ice. It follows that these factors may be regulated and adjusted by regulation of the degree of restriction at 33, and by regulation of the time period during which the switch 51 is closed. It is desirable that the switch 54 be held closed, after opening of the switch 51, for a sufficient length of time to insure that all water within the chamber has been expelled, in solid or in liquid form, yet, of course, the impelling means should not continue to operate indefinitely, nor long after the last of the water has been expelled from the chamber. Such factors are readily determined in the design of any specific unit.

By this mechanism, then, by proper design and regulation of the several coordinated controls, it is possible to supply either an indeterminate amount of water (by eliminating the time-delay device at 52 and controlling the period of flow by the length of closure of the push button 5), or to supply a given volume of water upon momentary closure of the push button at 5 through the time-delay mechanism at 52. Given a specified volume of water to be supplied, which could be just sufficient to fill an ordinary water glass, that water is admitted to the interior of the freezing chamber at a flow rate which, in conjunction and coordination with the rate of impelling through the chamber and in further conjunction with the capacity of the refrigerating unit 2 as related to the surface area of the chamber 1, will cause a given percentage of that water to congeal as ice and to be dislodged by the scraper blades 41, and impelled, with the remainder of water, out the spout at 15. There the mixture of water and ice is received in the receptacle G, and if the volume has been arranged to be just sufficient to fill the glass, the filled glass is then removed, ready for serving. It is evident that it becomes possible to supply almost any desired ratio of ice to water, from all ice to all chilled water. Preferably, however, the ratio is some intermediate ratio, such as 40% ice and 60% water.

I claim as my invention:

1. A dispenser of a mixture of potable water and ice, comprising a freezing chamber having a discharge opening, a refrigerating unit operatively connected to said chamber, and of a selected capacity to freeze a given quantity of water within said chamber in a given period of time, means to supply water to said chamber, and of a capacity selected to supply such water at a rate in excess of the chamber's freezing capacity, a cut-off valve in said water supply means to initiate and terminate such supply, valve opening and closing means operatively connected to said valve, an actuator operatively connected to said valve opening and closing means, and movable into position to energize the same for initiation of water supply to the chamber, and conversely into position to deenergize the same to enable termination of such water supply, a first time-delay means operatively connected to the valve opening and closing means to continue energization of the latter for a predetermined time following movement of the actuator into deenergizing position, and thereupon to deenergize the same, and thereby to effect supply of a metered quantity of water into the freezing chamber within the given time period; means to dislodge ice as formed in said chamber and to advance ice as dislodged and the unfrozen water remainder to said discharge opening, for evacuation of the freezing chamber through said discharge opening, motor means operatively connected to said ice dislodging and ice and water advancing means, motor-energizing means energizable for movement into energizing position and deenergizable for movement into deenergizing position, said valve opening and closing means being operatively connected to said motor-energizing means to energize and deenergize the latter substantially coincident with energization and deenergization, respectively, of the valve opening and closing means, a second time-delay means, operatively connected to said motor-energizing means to continue the latter in energizing position for a selected period following deenergization of the valve opening and closing means, to evacuate the metered quantity of ice and water from the freezing chamber while the water remainder is still unfrozen.

2. A dispenser of the kind and for the purpose set forth in claim 1, including adjustable means operatively connected in the water supply means to regulate the rate of water supply, and therefore the amount which is supplied during the time period when the cut-off valve is open, as determined by said first time-delay means.

3. A dispenser for a mixture of potable liquid and ice, comprising a freezing chamber of freezing capacity to turn a given quantity of water or the like into ice in a given period of time, normally deenergized means to supply potable aqueous liquid thereinto upon energization, normally deenergized means energizable to dislodge and expel from the chamber the ice so formed, and to discharge also any liquid remainder, at a rate such that the liquid supplied to the chamber and such ice as is frozen therefrom will be expelled or discharged therefrom before more than a given part thereof has been frozen into ice, control means operable to energize the liquid supply means and the ice dislodging and ice and liquid expelling and discharging means substantially simultaneously, means operable for a given time after such energization, such that the quantity of liquid supplied is metered, to continue energization of and then to deenergize automatically the liquid supply means, and means operable to continue energization of the dislodging, expelling and discharging means, following deenergization of the liquid supply means, and then to deenergize the same automatically after a time period sufficient to evacuate the freezing chamber of all frozen and still liquid parts of the metered quantity of liquid supplied.

4. A dispenser as in claim 3, characterized in that each of the liquid supply energizing and deenergizing means, and the dislodging, expelling, and discharging means, respectively, includes a timer device to continue their energization during a time period sufficient to effect supply of such quantity of liquid, with relation to the rate of liquid supply, the chamber's freezing capacity, and the rate of expulsion and discharge, as can be only partly frozen, to effect deenergization of the liquid supply means after such quantity has been supplied, and to effect deenergization of the dislodging, expelling, and discharging means at such predetermined time after deenergization of the liquid supply means that substantially such entire quantity of liquid, in frozen or still liquid form, has been evacuated from the chamber.

5. A dispenser as in claim 4, including means to regulate the rate of liquid supply, and thereby to vary the quantity of liquid supplied without alteration of the timer means.

6. A dispenser of a mixture of potable water and ice, comprising a container having a freezing surface, a delivery outlet formed in one wall of said chamber adjacent said freezing surface, water supply means operable to deliver water into said container and upon said freezing surface, mechanical scraper means operable to break ice formed on said surface, and when freed from said surface to move it, and also any unfrozen water remainder, progressively towards said outlet for delivery through the same, control means to energize said water supply means and said scraper means substantially simultanetously, a first time-delay means energizable by said control means and operable to continue energization of said water supply means for a predetermined period of time following actuation of said control means, and then to deenergize the same, and a second time-delay means cooperating with said control means and operable to continue energization of said scraper means for a predetermined period following deenergization of said water supply means, and then to deenergize the same.

References Cited in the file of this patent

UNITED STATES PATENTS

| | | |
|---|---|---|
| 1,930,569 | Taylor | Oct. 17, 1933 |
| 1,930,570 | Taylor | Oct. 17, 1933 |
| 2,259,841 | Spiegl | Oct. 21, 1941 |
| 2,280,320 | Taylor | Apr. 21, 1942 |
| 2,310,468 | Short | Feb. 9, 1943 |
| 2,444,514 | Kubaugh | July 6, 1948 |
| 2,549,747 | Leeson | Apr. 17, 1951 |
| 2,556,510 | Topping | June 12, 1951 |